US012638371B2

(12) United States Patent
Paeng et al.

(10) Patent No.: US 12,638,371 B2
(45) Date of Patent: May 26, 2026

(54) SURFACE ENERGY MEASUREMENT INSTRUMENT FOR METAL FOIL AND MEASUREMENT METHOD USING THE SAME

(71) Applicant: LG Energy Solution, Ltd., Seoul (KR)

(72) Inventors: Ki Hoon Paeng, Daejeon (KR); Jae Won Moon, Daejeon (KR); Sang Myeon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 318 days.

(21) Appl. No.: 18/279,308

(22) PCT Filed: Dec. 1, 2022

(86) PCT No.: PCT/KR2022/019417
§ 371 (c)(1),
(2) Date: Aug. 29, 2023

(87) PCT Pub. No.: WO2023/106737
PCT Pub. Date: Jun. 15, 2023

(65) Prior Publication Data
US 2024/0142358 A1 May 2, 2024

(30) Foreign Application Priority Data

Dec. 10, 2021 (KR) ......................... 10-2021-0176561
Dec. 10, 2021 (KR) ......................... 10-2021-0176579

(51) Int. Cl.
*G01N 13/02* (2006.01)
*G01N 21/88* (2006.01)

(52) U.S. Cl.
CPC ............. *G01N 13/02* (2013.01); *G01N 21/88* (2013.01); *G01N 2013/0275* (2013.01)

(58) Field of Classification Search
CPC . G01N 13/02; G01N 21/88; G01N 2013/0275
(Continued)

(56) References Cited

U.S. PATENT DOCUMENTS 4,017,870 A 4/1977 Hubbard et al.
5,387,046 A 2/1995 Danno
(Continued)

FOREIGN PATENT DOCUMENTS

CN 1098338 A 2/1995
CN 211106555 U 7/2020
(Continued)

OTHER PUBLICATIONS

Korean Lee reference (Year: 2016).*
(Continued)

*Primary Examiner* — Peter J Macchiarolo
*Assistant Examiner* — Rodney T Frank
(74) *Attorney, Agent, or Firm* — Lerner David LLP

(57) ABSTRACT
The present invention relates to a surface energy measurement instrument configured to apply a measurement reagent to a surface of metal foil to measure surface energy of the metal foil, the surface energy measurement instrument including a main body unit configured to store and discharge the measurement reagent and an application unit configured to apply the measurement reagent to the surface of the metal foil, wherein the main body unit includes a reagent storage portion configured to store the measurement reagent, a reagent injection port located at an upper part of the reagent storage portion, a reagent discharge port located at a lower part of the reagent storage portion, and a discharge amount adjustment portion connected to the reagent discharge port, the discharge amount adjustment portion being configured to adjust the discharge amount of the measurement reagent to be discharged from the reagent storage portion.

18 Claims, 5 Drawing Sheets

(58) Field of Classification Search
USPC ........................................................ 73/64.51
See application file for complete search history.

(56) References Cited

U.S. PATENT DOCUMENTS

| | | | |
|---|---|---|---|
| 9,647,272 | B1 | 5/2017 | Cheng et al. |
| 9,825,302 | B1 | 11/2017 | Shin et al. |
| 2010/0206057 | A1 | 8/2010 | Batchelder et al. |
| 2017/0338493 | A1 | 11/2017 | Shin et al. |

FOREIGN PATENT DOCUMENTS

| | | | | |
|---|---|---|---|---|
| CN | 111596182 | A | 8/2020 | |
| CN | 212275878 | U | 1/2021 | |
| CN | 212932302 | U | 4/2021 | |
| CN | 214097548 | U | 8/2021 | |
| EP | 0919801 | A1 | 6/1999 | |
| JP | S6165342 | U | 5/1986 | |
| JP | H11-230886 | A | 8/1999 | |
| JP | 2000-097835 | A | 4/2000 | |
| JP | 2003136886 | A | 5/2003 | |
| JP | 2010507803 | A | 3/2010 | |
| JP | 5109738 | B2 | 12/2012 | |
| KR | 100872926 | B1 | 12/2008 | |
| KR | 100980502 | B1 | 9/2010 | |
| KR | 2010-0125091 | A | 11/2010 | |
| KR | 101538236 | B1 | 7/2015 | |
| KR | 101583303 | B1 * | 1/2016 | ............ G01N 21/84 |
| KR | 101806953 | B1 | 12/2017 | |
| KR | 101809189 | B1 | 12/2017 | |
| KR | 101952307 | B1 | 2/2019 | |
| KR | 102012670 | B1 | 8/2019 | |
| WO | 2015075754 | A1 | 5/2015 | |
| WO | 2016098993 | A1 | 6/2016 | |

OTHER PUBLICATIONS

International Search Report for PCT/KR2022/019417 mailed Mar. 8, 2023. 3 pgs.

Extended European Search Report including Written Opinion for Application No. 22904567.9 dated Jul. 10, 2024, pp. 1-13.

Search Report dated Aug. 19, 2025 from the Office Action for Chinese Application No. 202280008357.7 issued Aug. 21, 2025, 3 pages.

* cited by examiner

【FIG. 1】
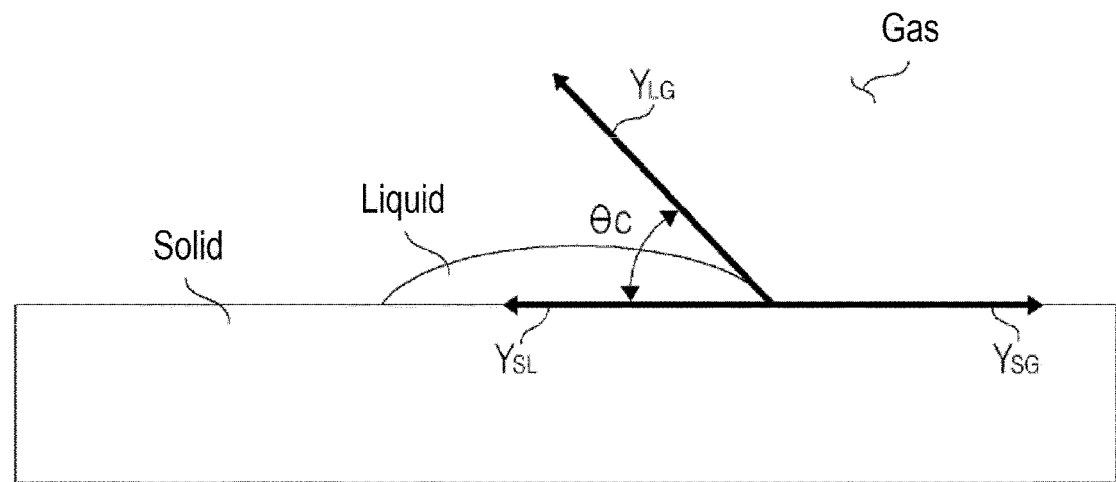
【FIG. 2】
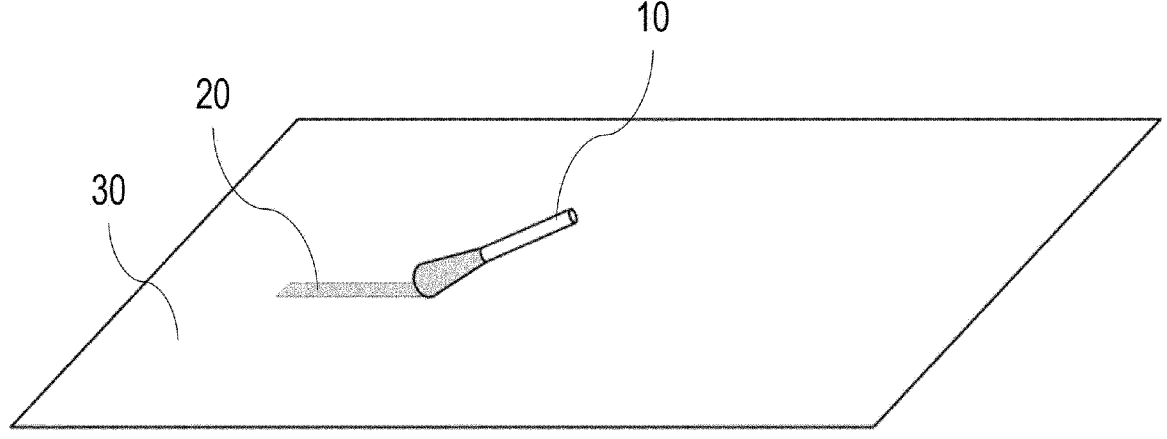

【FIG. 3】
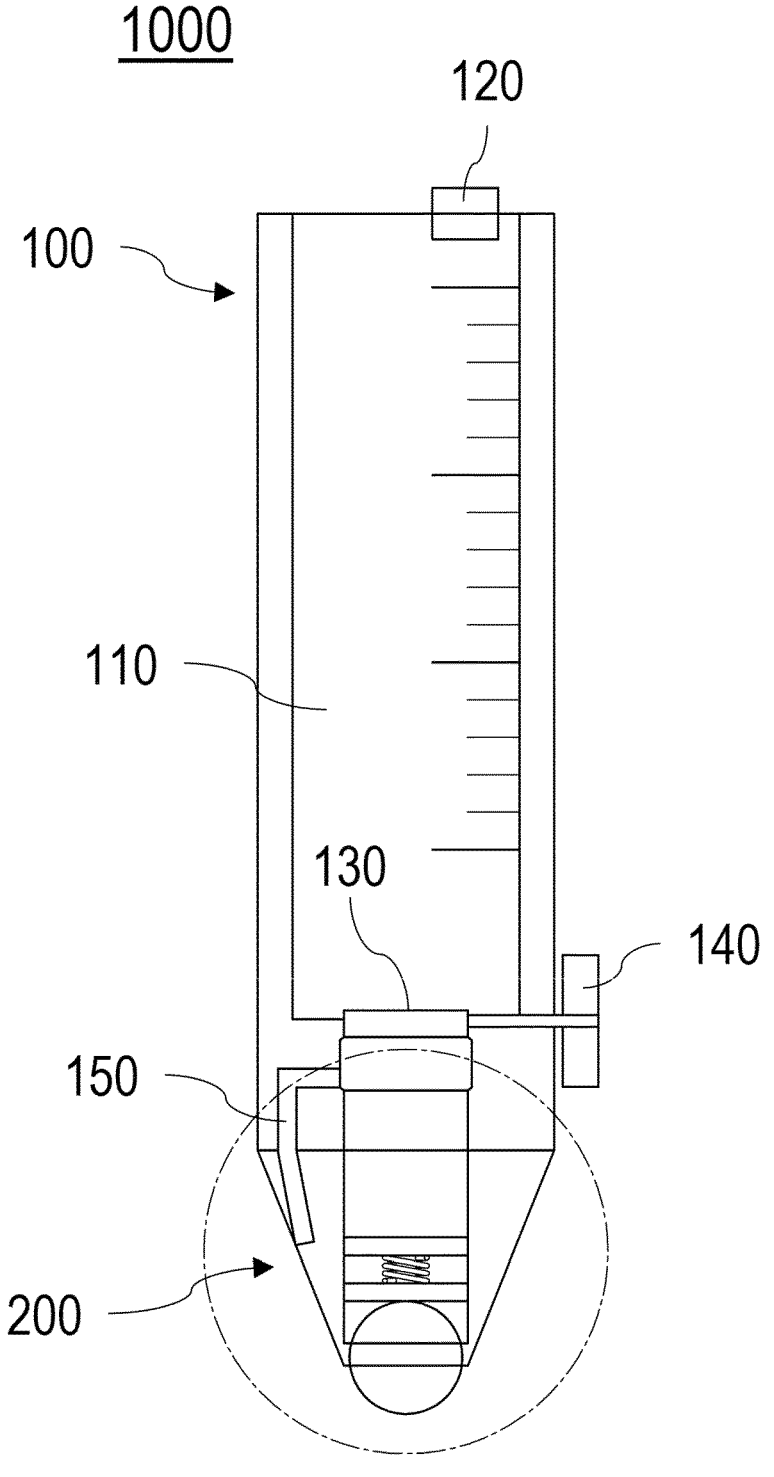

【FIG. 4】
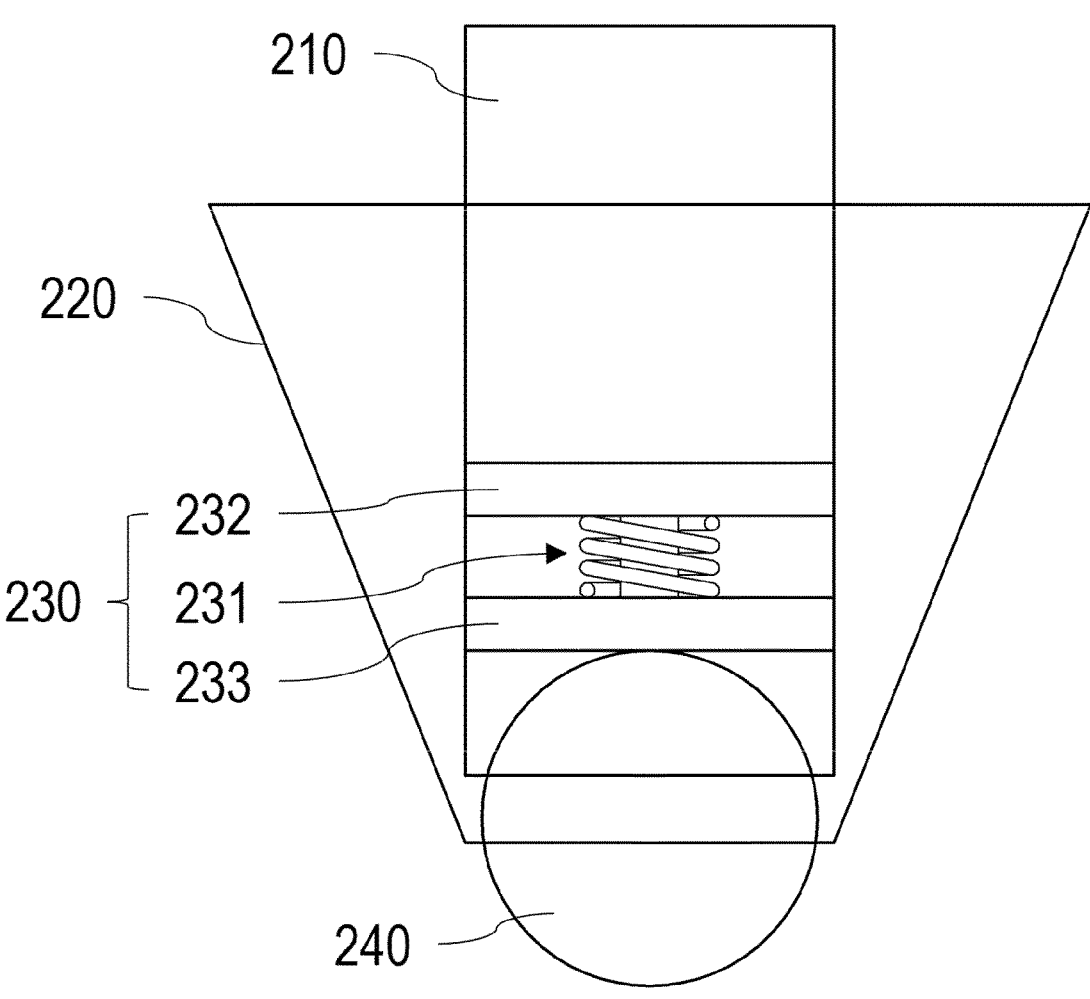

【FIG. 5】
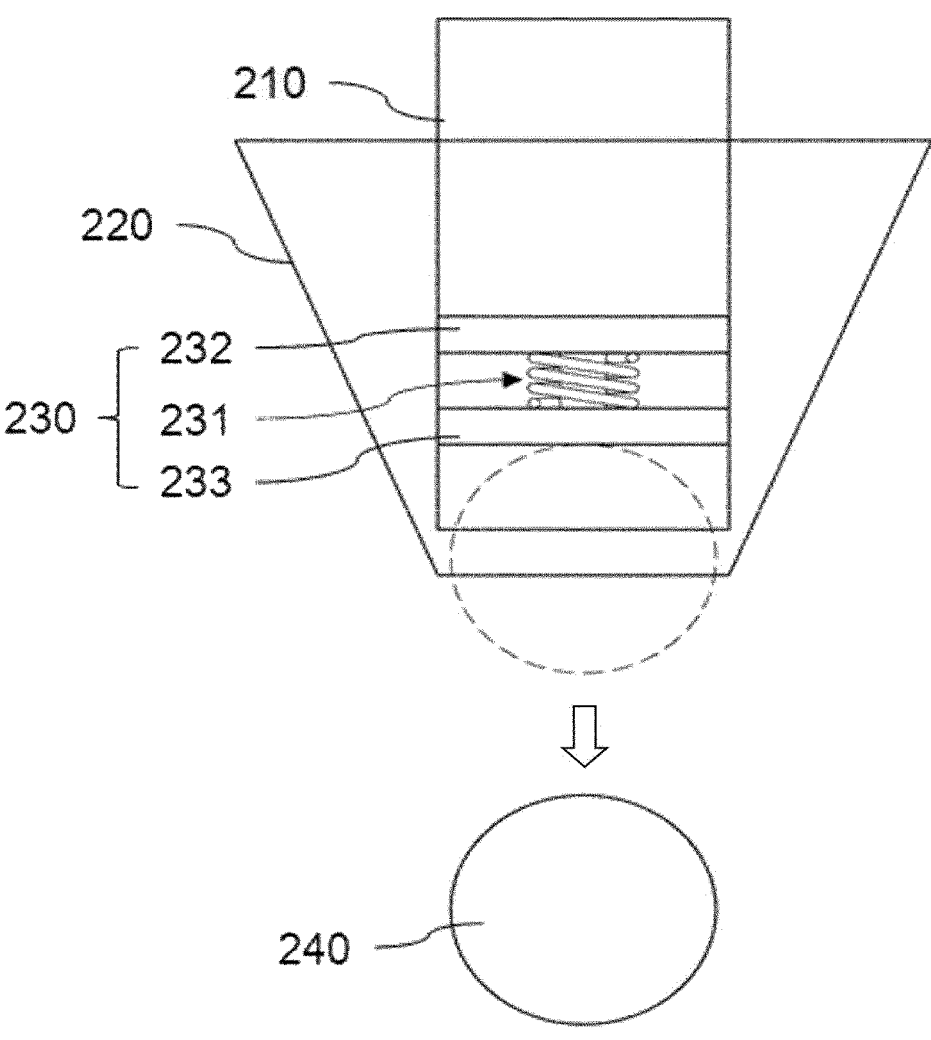
【FIG. 6】
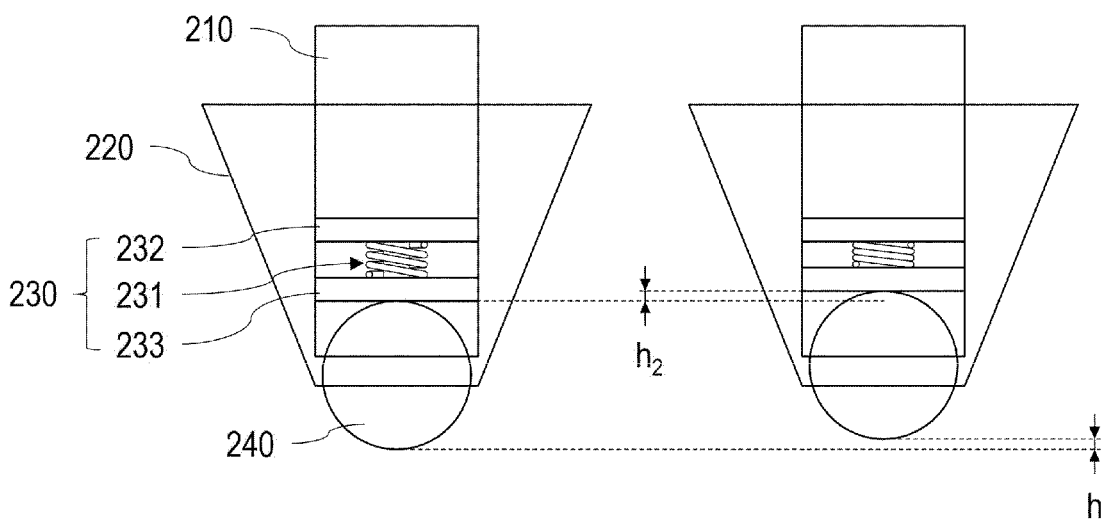

【FIG. 7】
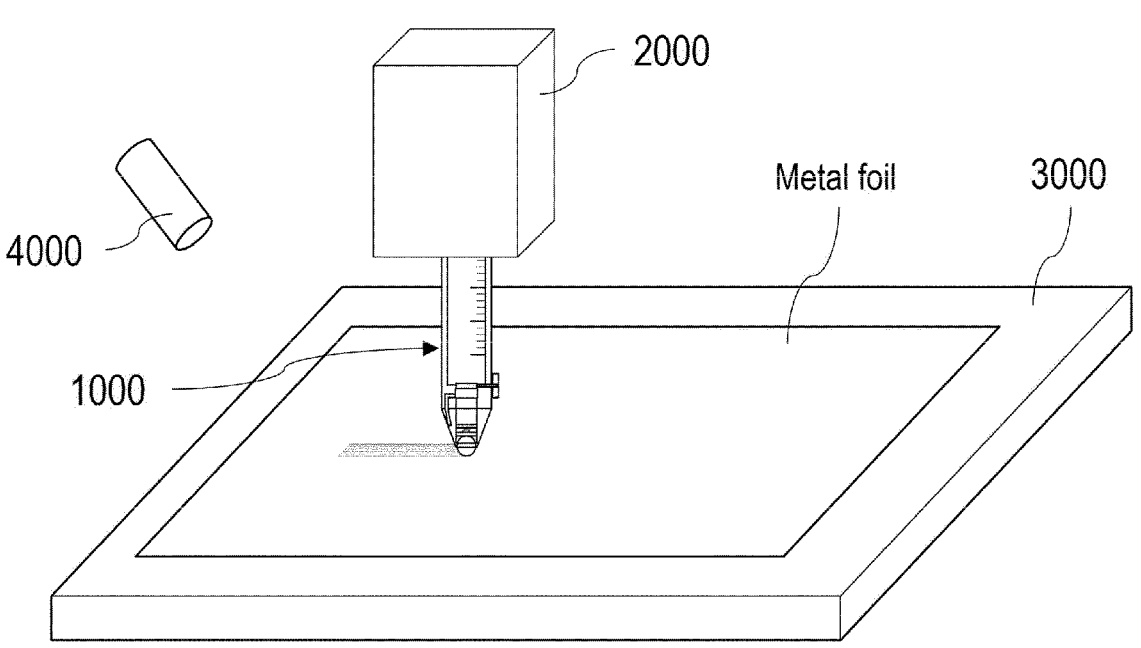

SURFACE ENERGY MEASUREMENT INSTRUMENT FOR METAL FOIL AND MEASUREMENT METHOD USING THE SAME

CROSS-REFERENCE TO RELATED APPLICATIONS

This application is a national stage entry under 35 U.S.C. § 371 of International Application No. PCT/KR2022/019417, filed on Dec. 1, 2022, which claims the benefit of priority to Korean Patent Application No. 10-2021-0176561, filed on Dec. 10, 2021, and Korean Patent Application No. 10-2021-0176579, filed on Dec. 10, 2021, the disclosures of which are hereby incorporated herein by reference in theirs entireties.

TECHNICAL FIELD

This application claims the benefit of priority to Korean Patent Application No. 2021-0176561 filed on Dec. 10, 2021 and Korean Patent Application No. 2021-0176579 filed on Dec. 10, 2021, the disclosures of which are incorporated herein by reference in theirs entireties.

TECHNICAL FIELD

The present invention relates to a surface energy measurement instrument capable of conveniently and rapidly measuring surface energy of metal foil and a surface energy measurement method capable of accurately measuring surface energy of metal foil using a surface energy measurement instrument configured to uniformly apply a measurement reagent to a surface of the metal foil.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel cadmium battery, a nickel hydride battery, and a nickel zinc battery as secondary batteries that are widely used at present.

In general, such a secondary battery is formed by receiving an electrode assembly and an electrolytic solution in a battery case.

Here, the electrode assembly may be a jelly-roll type assembly, which is configured to have a structure in which a long sheet type positive electrode and a long sheet type negative electrode are wound in the state in which a separator is interposed therebetween, a stacked type assembly, which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type assembly, which is configured to have a structure in which battery cells are stacked in the state in which a separator is interposed therebetween and are then attached to each other; however, the present invention is not limited thereto.

Meanwhile, the electrode of the secondary battery is manufactured through processes of applying slurry, manufactured by dispersing an active material, a conductive agent, and a binder in a solvent, to an electrode current collector and drying the slurry.

Metal foil is generally used as the electrode current collector. In particular, aluminum foil is mainly used as a positive electrode current collector, and copper foil is mainly used as a negative electrode current collector.

The metal foil is manufactured by cold rolling so as to have properties necessary as the current collector. As a result, some of rolling oil remains on the surface of the metal foil even though the rolling oil is removed in a post-rolling process.

If a predetermined amount or more of the rolling oil remains on the surface of the metal foil, coating efficiency may be reduced in a process of applying slurry to the electrode current collector.

Consequently, it is necessary to measure surface energy of the electrode current collector before an application process in order to maintain the surface energy at a predetermined level, thereby controlling quality of the electrode current collector.

As shown in FIG. 1, in a conventional surface energy measurement method disclosed in Patent Document 1, wherein liquid is dropped to a surface of a target to be measured to measure a contact angle, it is possible to accurately measure a surface energy value; however, there is a problem in that complicated equipment, as disclosed in Patent Document 1, is needed and this measurement method is not suitable for easy and rapid measurement on a production line.

As shown in FIG. 2, therefore, a measurement reagent 20 is applied to a surface of metal foil 30 in a long line shape using a cotton swab 10, and the degree of breakage of the line is checked to determine whether surface energy of the metal foil 30 satisfies a desired level.

Maintaining the application amount of the measurement reagent and the thickness of the line so as to be uniform is important for accuracy in measurement; however, the above conventional measurement method has a problem in that the application amount of the measurement reagent 20 and the thickness of the line are changed depending on the shape of the cotton swab 10, the angle between the cotton swab 10 and the surface of the metal foil 30, and force applied to the cotton swab 10.

In particular, a measurer directly draws a line on the surface of the metal foil 30 using the cotton swab 10 soaked with the measurement reagent 20, and therefore it is difficult to maintain the pressure applied to the cotton swab 10 so as to be uniform.

Meanwhile, a dyne pen may be used instead of the cotton swab. Even when the measurement reagent is applied using the dyne pen, however, there is a problem in that the application amount of the measurement reagent is not uniform, and it is difficult to repeatedly use the dyne pen due to contamination of the dyne pen, and therefore expenses are increased.

PRIOR ART DOCUMENT (Patent Document 1) Korean Registered Patent Publication No. 1952307

DISCLOSURE

Technical Problem

The present invention has been made in view of the above problems, and it is an object of the present invention to provide a surface energy measurement instrument capable of uniformly applying a measurement reagent to a surface of metal foil, wherein the surface energy measurement instrument has a replaceable cotton ball, and a measurement method using the same.

Technical Solution

A surface energy measurement instrument according to the present invention to accomplish the above object, which is a surface energy measurement instrument configured to apply a measurement reagent to a surface of metal foil in order to measure surface energy of the metal foil, includes a main body unit (100) configured to store and discharge the measurement reagent and an application unit (200) configured to apply the measurement reagent supplied from the main body unit (100) to the surface of the metal foil, wherein the main body unit (100) includes a reagent storage portion (110) configured to store the measurement reagent, a reagent injection port (120) located at an upper part of the reagent storage portion (110), the reagent injection port being configured to allow the measurement reagent to be injected into the reagent storage portion (110) therethrough, a reagent discharge port (130) located at a lower part of the reagent storage portion (110), the reagent discharge port being configured to allow the measurement reagent to be discharged therethrough, and a discharge amount adjustment portion (140) connected to the reagent discharge port (130), the discharge amount adjustment portion being configured to adjust the discharge amount of the measurement reagent to be discharged from the reagent storage portion (110).

Also, in the surface energy measurement instrument according to the present invention, the application unit (200) may include a connection portion (210) connected to the main body unit (100) and a cotton ball (240) located at a lower part of the connection portion (210), the cotton ball (240) being configured to contact the surface of the metal foil in order to apply the measurement reagent to the surface of the metal foil.

Also, in the surface energy measurement instrument according to the present invention, the application unit (200) may further include a stopper (230) located between the connection portion (210) and the cotton ball (240), the stopper being configured to adjust the pressure applied to the cotton ball (240) in order to control an application amount of the measurement reagent so as to be uniform.

Also, in the surface energy measurement instrument according to the present invention, the stopper (230) may include a spring (231) configured to adjust the pressure applied to the cotton ball (240), a fixing portion (232) located above the spring (231), the fixing portion being configured to fix the spring; and a pressing portion (233) located under the spring (231), the pressing portion being configured to contact the cotton ball (240).

Also, in the surface energy measurement instrument according to the present invention, the application unit (200) may further include a cover portion (220) located so as to wrap the stopper (230), the connection portion (210), and the cotton ball (240).

Also, in the surface energy measurement instrument according to the present invention, an upper part of the cover portion (220) connected to the main body unit (100) may be wide and a lower part of the cover portion, at which the cotton ball (240) is located, may be narrow, whereby a side surface of the cover portion may be inclined.

Also, in the surface energy measurement instrument according to the present invention, the main body unit (100) may further include a discharge pipe (150) configured to supply the measurement reagent discharged from the reagent storage portion (110) to the cotton ball (240).

Also, in the surface energy measurement instrument according to the present invention, one side of the discharge pipe (150) may be connected to the reagent discharge port (130), and the end of the other side of the discharge pipe may abut an inner wall surface of the cover portion (220).

Also, in the surface energy measurement instrument according to the present invention, the discharge amount adjustment portion (140) may have a dial gauge configured to adjust the discharge amount of the measurement reagent.

Also, in the surface energy measurement instrument according to the present invention, the cotton ball (240) may be replaceable.

In addition, a surface energy measurement method according to the present invention, which is a method of measuring surface energy of metal foil using a surface energy measurement instrument (1000) configured to uniformly apply a measurement reagent to a surface of the metal foil, includes a) locating the metal foil on a measurement table (3000); b) injecting the measurement reagent into the surface energy measurement instrument (1000); c) mounting the surface energy measurement instrument (1000) to a jig (2000); d) moving the measurement table (3000) to locate the surface energy measurement instrument (1000) on the surface of the metal foil; and e) moving the measurement table (3000) to apply the measurement reagent to the surface of the metal foil in a line shape.

Also, in the surface energy measurement method according to the present invention, the surface energy measurement instrument (1000) may include a main body unit (100) configured to store and discharge the measurement reagent and an application unit (200) configured to apply the measurement reagent supplied from the main body unit to the surface of the metal foil, and the application unit (200) may include a cotton ball (240) configured to contact the metal foil in order to apply the measurement reagent to the surface of the metal foil.

Also, the surface energy measurement method according to the present invention may further include f) sensing the line shape of the measurement reagent using a camera (4000) to determine whether a defect has occurred after step e).

Also, in the surface energy measurement method according to the present invention, in step f), whether the defect has occurred may be determined based on a degree of breakage of the line sensed by the camera.

Also, in the surface energy measurement method according to the present invention, the jig may be provided with a push pull gauge.

Also, in the surface energy measurement method according to the present invention, step d) may include moving the measurement table in a vertical direction so as to reach pressure set in the push pull gauge.

Also, in the surface energy measurement method according to the present invention, step d), step e), and step f) may be repeatedly performed at different positions on the metal foil to determine whether the defect has occurred.

Also, the surface energy measurement method according to the present invention may further include replacing the cotton ball of the surface energy measurement instrument after determining whether the metal foil is defective.

Also, in the surface energy measurement method according to the present invention, the measurement reagent may include ethylene glycol monoethyl ether.

Also, in the surface energy measurement method according to the present invention, the metal foil may be aluminum (Al) foil.

Advantageous Effects

A surface energy measurement instrument according to the present invention has an advantage in that it is possible to uniformly apply a measurement reagent to a surface of metal foil without an additional device, whereby it is possible to conveniently and accurately measure surface energy of the metal foil.

In addition, the surface energy measurement instrument according to the present invention has an advantage in that it is possible to easily replace a cotton ball configured to contact the metal foil, whereby it is possible to reduce measurement expenses.

In addition, a surface energy measurement method according to the present invention has an advantage in that it is possible to uniformly apply the measurement reagent to the surface of the metal foil at a predetermined pressure using a minutely movable measurement table and a push pull gauge.

In addition, the surface energy measurement method according to the present invention has an advantage in that it is possible to uniformly apply the measurement reagent and sense the applied state of the measurement reagent through a camera, whereby it is possible to conveniently and accurately measure surface energy of the metal foil.

DESCRIPTION OF DRAWINGS

FIG. 1 is a view schematically showing a conventional method of measuring a contact angle to measure surface energy.

FIG. 2 is a view schematically showing a conventional method of wetting a cotton swab with a measurement reagent to measure surface energy.

FIG. 3 is a view schematically showing a surface energy measurement instrument according to an embodiment of the present invention.

FIG. 4 is an enlarged view of an application unit in a dotted line of FIG. 3.

FIG. 5 is a view showing the state in which a cotton ball is removed from the surface energy measurement instrument according to the embodiment of the present invention.

FIG. 6 is a view showing the behavior of a stopper of the surface energy measurement instrument according to the embodiment of the present invention before pressing (a) and after pressing (b).

FIG. 7 is a view schematically showing a surface energy measurement method according to an embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a surface energy measurement instrument according to the present invention will be described with reference to the accompanying drawings.

FIG. 3 is a view schematically showing a surface energy measurement instrument according to an embodiment of the present invention, and FIG. 4 is an enlarged view of an application unit in a dotted line of FIG. 3.

When describing the surface energy measurement instrument 1000 according to the present invention with reference to FIGS. 3 and 4, the surface energy measurement instrument 1000 according to the present invention mainly includes a main body unit 100 configured to store and discharge a measurement reagent and an application unit 200 configured to uniformly apply the measurement reagent discharged from the main body unit to a surface of metal foil having surface energy to be measured.

First, the main body unit 100 includes a reagent storage portion 110, a reagent injection port 120, a reagent discharge port 130, a discharge amount adjustment portion 140, and a discharge pipe 150.

The reagent storage portion 110, which is a part that stores a predetermined amount of measurement reagent, is capable of sufficiently storing the measurement reagent, whereby it is possible to measure surface energy of metal foil without additional supply of the measurement reagent.

Unlike when a conventional cotton swab is used, therefore, it is possible to solve inconvenience due to frequent injection of the reagent, and the reagent storage portion 110 may be made of a transparent material such that the amount of the measurement reagent in the reagent storage portion 110 can be checked, and may be graduated such that the residual amount of the measurement reagent can be immediately checked.

The material for the reagent storage portion 110 may be appropriately selected under conditions in which the material has transparency to such an extent that the residual amount of the measurement reagent in the reagent storage portion can be checked and has no reactivity with the measurement reagent stored in the reagent storage portion.

In addition, the reagent storage portion 110 may have a cylindrical shape or a polygonal columnar shape, and the thickness of the reagent storage portion may be appropriately selected within a range within which a measurer can easily use the reagent storage portion, although the thickness of the reagent storage portion is not particularly restricted.

The reagent injection port 120, through which the measurement reagent is injected into the reagent storage portion 110, is provided at an upper part of the reagent storage portion 110, and the reagent injection port 120 can be opened and closed.

In addition, the reagent discharge port 130, through which the measurement reagent is discharged from the reagent storage portion 110, is provided at a lower part of the reagent storage portion 110, and the discharge amount adjustment portion 140, which is configured to adjust the amount of the measurement reagent to be discharged, is connected to the reagent discharge port 130.

Any of various known devices, such as a valve, may be used as the discharge amount adjustment portion 140, and a dial gauge capable of conveniently adjusting the discharge amount is preferably used.

In addition, the discharge pipe 150, which guides the measurement reagent discharged from the reagent discharge port 130 to a desired position of the application unit 200, is provided under the reagent discharge port 130.

Meanwhile, the application unit 200 includes a connection portion 210, a cover portion 220, a stopper 230, and a cotton ball 240.

An upper part of the connection portion 210 is connected to the main body unit 100, and the stopper 230 and the cotton ball 240 are provided at a lower part of the connection portion.

The cover portion 220 is configured to wrap the connection portion 210, the stopper 230, and the cotton ball 240, and an upper part of the cover portion 220 connected to the main body unit 100 is wider, whereas a lower part of the cover portion 220, at which the cotton ball 240 is located, is narrower.

A side surface of the cover portion 220 having the above shape is inclined, and the end of the discharge pipe 150, from which the measurement reagent is discharged, may be configured to abut an inner wall surface of the cover portion 220.

In this case, the measurement reagent discharged from the discharge pipe 150 flows down along the inner wall surface of the cover portion 220 and soaks into the cotton ball 240 located under the discharge pipe.

Consequently, it is possible to appropriately adjust the discharge amount of the measurement reagent using the discharge amount adjustment portion 140, and it is possible to continuously supply a predetermined amount of the measurement reagent to the cotton ball 240 when the cotton ball 240 is brought into contact with the metal foil to measure surface energy, whereby it is possible to improve accuracy in measurement of surface energy.

The cotton ball 240, which is formed by making a lump of cotton into a ball, can be compressed when pressure is applied thereto and allows a solution to easily soak thereinto. Any of various known cotton balls 240 may be appropriately selected and used.

FIG. 5 is a view showing the state in which the cotton ball is removed from the surface energy measurement instrument according to the embodiment of the present invention.

In addition, the cotton ball 240 may be easily removed from the surface energy measurement instrument 1000 according to the present invention so as to be replaced with a new one after use thereof, as shown in FIG. 5, and therefore it is possible to prevent the cotton ball from being contaminated by rolling oils remaining in the metal foil.

FIG. 6 is a view showing the behavior of the stopper of the surface energy measurement instrument according to the embodiment of the present invention before pressing (a) and after pressing (b).

When describing the stopper 230 according to the present invention with reference to FIGS. 3, 4 and 6, the stopper 230, which is configured to adjust the pressure applied to the cotton ball 240 in order to control the application amount of the measurement reagent, includes a spring 231 configured to adjust the pressure applied to the cotton ball 240, a fixing portion 232 located above the spring 231, the fixing portion being configured to fix the spring 231, and a pressing portion 233 located under the spring 231, the pressing portion being configured to contact the cotton ball 240.

Meanwhile, the amount of the measurement reagent that is applied to the surface of the metal foil changed depending on the pressure applied to the cotton ball 240, to which the measurement reagent has been supplied, and therefore it is necessary to control the pressure applied to the cotton ball.

When the stopper 230 is provided above the cotton ball, therefore, the stopper 230 may absorb a part of the pressure even though the pressure applied to the cotton ball 240 in order to measure surface energy is a predetermined level or higher, whereby it is possible to prevent excessive pressure from being applied to the cotton ball 240.

That is, when pressure is applied to the cotton ball 240 in the state in which the surface energy measurement instrument 1000 is located on the metal foil, the difference $h_1$ in height between the cotton ball 240 before the pressure is applied thereto (a) and the cotton ball 240 after the pressure is applied thereto (b) occurs, as shown in FIG. 6.

If a predetermined pressure or higher is applied to the cotton ball 240, the pressure is transferred to the stopper 230, and the stopper 230 absorbs a part of the pressure, whereby the spring is compressed $h_2$, and therefore it is possible to prevent excessive pressure from being applied to the cotton ball 240 ($h_1 > h_2$).

The stopper 230 may be manufactured in the state in which elasticity of the spring 231 is appropriately selected within a desired pressure range.

FIG. 7 is a view schematically showing a surface energy measurement method according to an embodiment of the present invention.

When describing the method of measuring surface energy of the metal foil using the surface energy measurement instrument 1000 according to the present invention described above with reference to FIG. 7, the surface energy measurement method includes a) a step of locating metal foil on a measurement table 3000, b) a step of injecting a measurement reagent into the surface energy measurement instrument 1000, c) a step of mounting the surface energy measurement instrument 1000 to a jig 2000, d) a step of moving the measurement table 3000 to locate the surface energy measurement instrument 1000 on a surface of the metal foil, and e) a step of moving the measurement table 3000 to apply the measurement reagent to the surface of the metal foil in a line shape.

In addition, a step of sensing the line shape of the measurement reagent using a camera 4000 to determine whether the measurement reagent application line is defective after the measurement reagent is applied to the surface of the metal foil is further included.

Whether the measurement reagent application line is defective may be determined based on the degree of breakage of the line sensed by the camera.

For example, when the measurement reagent application line is broken within a predetermined time, it is determined that the measurement reagent application line is defective.

Any of various known cameras may be used as the camera 4000 configured to sense the measurement reagent application line, and a CCD camera may be used as an example.

Meanwhile, a push pull gauge may be provided at the jig 2000, to which the surface energy measurement instrument 1000 is mounted, and therefore a desired pressure may be applied between the surface energy measurement instrument 1000 and the metal foil in conjunction with the measurement table 3000.

In addition, the measurement table 3000, on which the metal foil is seated, may be moved in a forward-rearward horizontal direction, a leftward-rightward horizontal direction, and a vertical direction.

Particularly, it is preferable for the measurement table 3000 to be minutely movable in units of mm in order to accurately measure surface energy. To this end, a driving means, such as a servomotor, may be provided.

The vertical movement of the measurement table 3000 may be minutely controlled in conjunction with the push pull gauge of the jig 2000 such that a predetermined pressure is applied between the surface energy measurement instrument 1000 and the metal foil.

In addition, the measurement table may be automatically moved at a uniform speed based on a set value even in the horizontal direction such that the measurement reagent can be uniformly applied to the surface of the metal foil.

Meanwhile, metal foil for mass production has a large surface area, whereby deviation in surface energy may occur depending on the position of the metal foil. In order to measure surface energy of the metal foil, therefore, it is preferable to draw two or more lines at different positions of the metal foil using the measurement reagent.

That is, a line is drawn on the metal foil in step d) and step e) of the measurement method described above, and a step of sensing the line to determine whether the line is defective is repeatedly performed.

Meanwhile, the cotton ball 240 of the surface energy measurement instrument 1000 may be appropriately replaced in consideration of contamination due to rolling oil remaining on the metal foil, or may be replaced after measurement for one piece of metal foil is completed; however, the present invention is not limited thereto.

Known measurement reagents may be used alone or in the state in which two or more thereof are mixed with each other at an appropriate ratio based on a desired dyne index as the measurement reagent used to measure the surface energy.

For example, when surface energy of aluminum (Al) foil used as a positive electrode current collector is measured, ethylene glycol monoethyl ether and formamide may be mixed with each other at an appropriate ratio so as to be used as the measurement reagent.

The ratio at which the two measurement reagents are mixed with each other may be selected with reference to a ratio set based on a required dyne index.

The metal foil determined to be a good product in the surface energy measurement step may be used as an electrode current collector.

That is, slurry including an active material may be applied to the metal foil to manufacture an electrode, and a battery cell may be manufactured using the electrode thus manufactured.

In addition, the battery cell may be manufactured in the form of a module or a pack so as to be used as a power source for various devices.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

1000: Surface energy measurement instrument
100: Main body unit

10

110: Reagent storage portion
120: Reagent injection port
130: Reagent discharge port
140: Discharge amount adjustment portion
150: Discharge pipe
200: Application unit
210: Connection portion
220: Cover portion
230: Stopper
231: Spring
232: Fixing portion
233: Pressing portion
240: Cotton ball
2000: Jig
3000: Measurement table
4000: Camera

The invention claimed is:

1. A surface energy measurement instrument configured to apply a measurement reagent to a surface of metal foil to measure a surface energy of the metal foil, the surface energy measurement instrument comprising:
   a main body unit configured to store and discharge the measurement reagent; and
   an application unit configured to apply the measurement reagent from the main body unit to the surface of the metal foil,
   wherein the main body unit comprises:
      a reagent storage portion configured to store the measurement reagent;
      a reagent injection port located at an upper part of the reagent storage portion, the reagent injection port being configured to receive an injection of the measurement reagent therethrough into the reagent storage portion;
      a reagent discharge port located at a lower part of the reagent storage portion, the reagent discharge port being configured to receive a discharge of the measurement reagent therethrough; and
      a discharge amount adjustment portion connected to the reagent discharge port, the discharge amount adjustment portion being configured to adjust a discharge amount of the measurement reagent to be discharged from the reagent storage portion, and
   wherein the application unit comprises:
      a connection portion connected to the main body unit;
      a cotton ball located at a lower part of the connection portion, the cotton ball being configured to contact the surface of the metal foil to apply the measurement reagent to the surface of the metal foil; and
      a stopper located between the connection portion and the cotton ball, the stopper being configured to adjust a pressure applied to the cotton ball to control an application amount of the measurement reagent so as to be uniform.

2. The surface energy measurement instrument according to claim 1, wherein the stopper comprises:
   a spring configured to adjust the pressure applied to the cotton ball;
   a fixing portion located above the spring and fixing the spring to the connection portion; and
   a pressing portion located under the spring and contacting the cotton ball.

3. The surface energy measurement instrument according to claim 1, wherein the application unit further comprises a cover portion wrapping around the stopper, the connection portion, and the cotton ball.

4. The surface energy measurement instrument according to claim 3, wherein an upper part of the cover portion connected to the main body unit has a first width and a lower part of the cover portion, at which the cotton ball is located, has a second width smaller than the first width, such that a side surface of the cover portion extending between the upper part and the lower part is inclined.

5. The surface energy measurement instrument according to claim 4, wherein the main body unit further comprises a discharge pipe configured to supply the measurement reagent from the reagent storage portion to the cotton ball.

6. The surface energy measurement instrument according to claim 5, wherein a first side of the discharge pipe is connected to the reagent discharge port, and an end of a second side of the discharge pipe abuts an inner wall surface of the cover portion.

7. The surface energy measurement instrument according to claim 1, wherein the discharge amount adjustment portion has a dial gauge configured to adjust the discharge amount of the measurement reagent.

8. The surface energy measurement instrument according to claim 1, wherein the cotton ball is replaceable.

9. A method of measuring a surface energy of a metal foil using a surface energy measurement instrument configured to uniformly apply a measurement reagent to a surface of the metal foil, the method comprising:

a) locating the metal foil on a measurement table;

b) injecting the measurement reagent into the surface energy measurement instrument, the surface energy measurement instrument having a cotton ball located at a lower part thereof;

c) mounting the surface energy measurement instrument to a jig;

d) moving the measurement table to locate the surface energy measurement instrument on the surface of the metal foil; and e) moving the measurement table to apply the measurement reagent to the surface of the metal foil in a line shape by contacting the cotton ball to the surface of the metal foil.

10. The method according to claim 9, wherein the surface energy measurement instrument comprises a main body unit that stores and discharges the measurement reagent and an application unit that applies the measurement reagent supplied from the main body unit to the surface of the metal foil, and the application unit comprises a cotton ball that contacts the metal foil and applies the measurement reagent to the surface of the metal foil.

11. The method according to claim 10, further comprising f) sensing the line shape of the measurement reagent using a camera to determine whether a defect has occurred after step e).

12. The method according to claim 11, wherein, during step f), whether the defect has occurred is determined based on a degree of breakage of the line shape sensed by the camera.

13. The method according to claim 11, wherein the jig is provided with a push pull gauge.

14. The method according to claim 13, wherein step d) comprises moving the measurement table in a vertical direction to reach a pressure set in the push pull gauge.

15. The method according to claim 11, wherein step d), step e), and step f) are repeatedly performed at different positions on the metal foil to determine whether the defect has occurred.

16. The method according to claim 15, comprising replacing the cotton ball of the surface energy measurement instrument after determining whether the metal foil is defective.

17. The method according to claim 11, wherein the measurement reagent comprises ethylene glycol monoethyl ether.

18. The method according to claim 17, wherein the metal foil is aluminum (Al) foil.

\*  \*  \*  \*  \*